(12) United States Patent
Kapur

(10) Patent No.: US 7,747,686 B2
(45) Date of Patent: Jun. 29, 2010

(54) SYSTEM AND METHOD FOR INTERACTING WITH DATA USING VISUAL SURROGATES

(75) Inventor: Shyam Kapur, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 552 days.

(21) Appl. No.: 11/394,745

(22) Filed: Mar. 31, 2006

(65) Prior Publication Data

US 2007/0233814 A1  Oct. 4, 2007

(51) Int. Cl.
*G06F 15/16* (2006.01)
*G06F 17/30* (2006.01)

(52) U.S. Cl. ............... 709/204; 709/219; 707/E17.111; 707/E17.107; 707/E17.119; 707/E17.141; 719/332

(58) Field of Classification Search .......... 709/219, 709/204; 707/E17.107, E17.111, E17.119, 707/E17.141; 719/332
See application file for complete search history.

(56) References Cited

U.S. PATENT DOCUMENTS

| | | | | |
|---|---|---|---|---|
| 5,794,178 A * | 8/1998 | Caid et al. | ...................... | 704/9 |
| 5,999,940 A * | 12/1999 | Ranger | ............................... | 1/1 |
| 6,340,977 B1 * | 1/2002 | Lui et al. | ..................... | 715/709 |
| 6,691,104 B1 * | 2/2004 | Kraft et al. | ...................... | 707/3 |
| 6,721,748 B1 * | 4/2004 | Knight et al. | .................. | 707/10 |
| 7,506,274 B2 * | 3/2009 | Zhang et al. | ................ | 715/854 |
| 2002/0154162 A1 * | 10/2002 | Bhatia et al. | ................ | 345/745 |
| 2004/0034629 A1 * | 2/2004 | Genser | ........................... | 707/3 |
| 2005/0050453 A1 * | 3/2005 | Barnabei | ..................... | 715/513 |
| 2005/0079477 A1 * | 4/2005 | Diesel et al. | ................. | 434/350 |
| 2005/0114254 A1 * | 5/2005 | Condie | ......................... | 705/37 |
| 2005/0171936 A1 * | 8/2005 | Zhu | ............................... | 707/3 |
| 2006/0059461 A1 * | 3/2006 | Baker et al. | .................. | 717/113 |
| 2007/0070066 A1 * | 3/2007 | Bakhash | ..................... | 345/419 |
| 2007/0106952 A1 * | 5/2007 | Matas et al. | ................ | 715/764 |
| 2007/0136696 A1 * | 6/2007 | Matthews | .................... | 715/854 |
| 2007/0180380 A1 * | 8/2007 | Khavari et al. | .............. | 715/704 |
| 2007/0239726 A1 * | 10/2007 | Weiss et al. | .................... | 707/10 |
| 2007/0283241 A1 * | 12/2007 | Baldonado et al. | .......... | 715/512 |

OTHER PUBLICATIONS

Miller et al. "Integrating a Command Shell Into a Web Browser," Carnegie Mellon University, Appeared in Proceedings of USENIX 2000 Annual Technical Conference, San Diego, CA, Jun. 2000.*

* cited by examiner

*Primary Examiner*—Alina N. Boutah
(74) *Attorney, Agent, or Firm*—Seth H. Ostrow, Esq.; Ostrow Kaufman & Frankl LLP

(57) ABSTRACT

The present invention relates to systems and methods for facilitating the interaction with data using interactive data structures. The method of the present invention comprises generating one or more objects associated with one or more items of content. The one or more objects are combined to form an interactive data structure. The content associated with the one or more objects and the interactive data structure are delivered to a client device. One or more modifications may be made to the one or more objects comprising the interactive data structure. The one or more modifications made to the one or more objects comprising the interactive data structure may be propagated to the content associated with the one or more objects.

17 Claims, 13 Drawing Sheets

SYSTEM AND METHOD FOR INTERACTING WITH DATA USING VISUAL SURROGATES

A portion of the disclosure of this patent document contains material which is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

BACKGROUND OF THE INVENTION

The present invention generally provides methods and systems that facilitate the conversion of content into one or more data structures to allow for greater user interaction with a plurality of data items. More specifically, the present invention provides methods and systems that facilitate the interaction with one or more data items comprising one or more data types using data structures associated with an original content source.

The Internet contains a vast amount of data that may be requested by users of client devices and displayed on a client device in a web page through the use of a browser. The data associated with a given web page is often comprised of audio, video, images, text, advertisements, links, banners, etc. The one or more items of data delivered in response to a request are often located in various positions of a given web page, displayed with various colors, fonts, etc. However, the position, format, location, etc., of content delivered with a web page may be unappealing to a given user. A user may desire to change the appearance of a given web page, such as by changing the fonts used, the location of one or more items or whether a given item in the web page is displayed.

Additionally, a web page delivered in response to a request or accessed by a given user may be difficult to navigate. For example, items of content responsive to a user search request are often delivered in a ranked list. While there may be hundreds or thousands of items that are relevant to a given search request, often only a limited number of items may be displayed in a given web page. A user may thus be required to traverse the plurality of web pages that are delivered in response to a search request to locate a desired item. Traversing web pages comprised of hundreds or thousands of results can prove to be time consuming and inefficient. Current methods for displaying a plurality of items on a given web page require users to select links, redirecting a user to a subsequent page of a given result of a search request. Such methods allow a user to see only a few items of content and further require a user to wait as a subsequent page loads in a user's browser.

Similarly, applications are available for users to maintain records of various items of data. Applications such as email applications may be used to deliver such data. However, delivering information to an individual, a destination, etc., often requires a user to expend a significant amount of time locating a phone number, email address, facsimile number, etc., as well as gathering all the data to deliver. For example, current methods for emailing one or more files requires a user of a client device to execute an email application, locate an email address, attach the one or more files to an email, etc. Moreover, users may be unable to use current methods for delivering particular types of content. For example, a user may want to deliver an advertisement, image, etc., in a given web page to another user. Current methods may require a user to either email the URL corresponding to the web page or "copy and paste" an image, advertisement, etc., from a given page into an application capable of receiving the type of data selected. Such methods make the individual selection and delivery of data inefficient and complicated.

Furthermore, data representing physical objects such as individuals, facsimile machines, cellular phones, addresses, etc., are often stored on a client device. A user of a client device may desire to contact an individual, arrange a meeting between two individuals, deliver content to a facsimile machine, send a given item of a webpage to a particular person, etc. Current methods for interacting with data representing real world objects requires users to locate information corresponding to the real world object, gather the data associated with the object, and use an appropriate application for delivering data, arranging a meeting, etc. Such methods fail to provide efficient use of the data representing real world objects.

In order to overcome shortcomings associated with existing systems and techniques, the present invention provides methods and systems for the creation of one or more data structures corresponding to one or more items of content, thereby facilitating the use of data representing real world objects, as well as allowing a user of a client device to customize the display of content and interaction therewith.

SUMMARY OF THE INVENTION

The present invention is directed towards methods and systems for interacting with data using interactive data structures. According to one embodiment of the invention, the method comprises generating one or more objects associated with one or more items of content. The content may comprise content contained within a web page, content maintained within a document, or content maintained in one or more applications. The objects are combined to form an interactive data structure. According to one embodiment of the invention, the objects are combined according to a structure identified by the content associated with the one or more objects. The content and interactive data structure may then be delivered to a client device. According to one embodiment of the invention, the content and interactive data structure are delivered in response to a user request.

The method further comprises receiving one or more modifications made to the one or more objects comprising an interactive data structure. According to one embodiment of the invention, the positioning of the one or more objects comprising an interactive data structure may be modified. According to another embodiment of the invention, the characters displayed in the one or more objects may be modified. According to a further embodiment of the invention, the display of the one or more objects comprising an interactive data structure may be activated or deactivated. According to yet another embodiment of the invention, a user may navigate throughout an interactive data structure. According to another embodiment of the invention, a user may combine two or more objects. The one or more modifications are propagated to the content associated with the one or more modified objects. According to one embodiment of the invention, an action is identified that is associated with the one or more modifications made to the one or more objects of an interactive data structure. An application is identified that may be operative to execute the identified action, and the action is executed using the application identified.

The invention is also directed towards a system for facilitating the interaction with data using interactive data structures. The system of the present invention comprises a search engine operative to retrieve one or more items of content. The system further comprises an object component operative to generate one or more objects associated with the one or more items of content retrieved by the search engine. The object component is operative to associate the one or more objects generated with one or more applications. The object component combines the one or more objects to form an interactive data structure. According to one embodiment of the invention, the object component combines the one or more objects according to a structure identified by the content associated with the one or more objects.

The object component transmits the interactive data structure to a client device. The object component is further operative to receive an indication of one or more modifications made to the one or more objects comprising the interactive data structure. The one or more modifications made to the one or more objects may be propagated to the content associated with the one or more objects. According to one embodiment of the invention, the object component is operative to receive an indication of the combination of a plurality of objects and identify the content associated with the plurality of objects. The object component identifies an action associated with the combination of the plurality of objects and executes the action associated with the combination using an application associated with the action and the content associated with the plurality of objects.

DETAILED DESCRIPTION OF THE DRAWINGS

In the following description of preferred embodiments, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
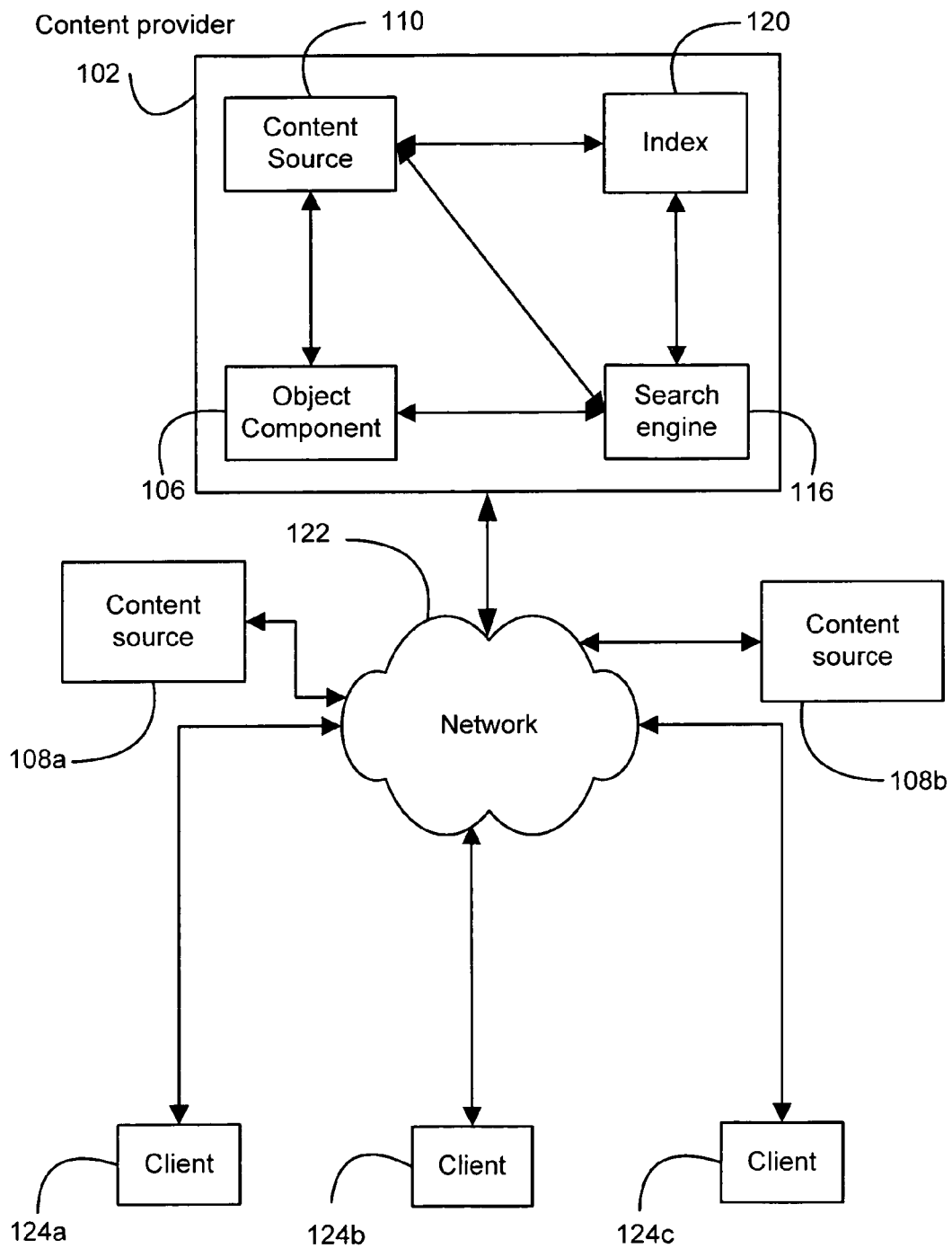
FIG. 1 is a block diagram presenting a system whereby client devices communicatively coupled to a network may retrieve content from a plurality of content sources according to one embodiment of the present invention.

FIG. 1 presents a block diagram illustrating one embodiment of a system for retrieving content responsive to a request and constructing one or more visual surrogates corresponding to the content. According to the system of FIG. 1, a content provider 102 may comprise a search engine 116 (which may comprise an index component operative to facilitate retrieving and ordering one or more items of content), a content data source 110 operative to store one or more items of content, wherein content may comprise data representing real world objects, and an object component 106 operative to construct one or more objects from one or more items of content.

The content provider 102 is communicatively coupled to a network 122, which may include a connection to one or more local and/or wide area networks, such as the Internet. A client device 124a, 124b and 124c may be any device that allows for the transmission of search requests to the content provider 102, as well as receipt of one or more items of content and corresponding objects from the content provider 102. According to one embodiment of the invention, a client device 124a, 124b and 124c is a general purpose personal computer comprising a processor, transient and persistent storage devices, input/output subsystem and bus to provide a communications path between components comprising the general purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, etc. The client device 124a, 124b and 124c typically runs software applications, such as a web browser, which provide for transmission of search requests, as well as the receipt and display of content, which may comprise a web page.

The search engine 116 receives a search request from a given client device 124a, 124b and 124c communicatively coupled to the network 122 and investigates the index 120 to identify one or more items of content responsive to the search request. According to one embodiment of the invention, the search engine 116 retrieves the one or more items of content from a local content source 110. Alternatively, or in conjunction with the foregoing, content is retrieved from one or more remote content sources 108a and 108b.

According to one embodiment of the invention, the content retrieved from local content source 110 or remote content sources 108a and 108b comprises one or more items to be displayed in one or more web pages responsive to a request received from a client device 124a, 124b and 124c. For example, a user of a client device 124a, 124b and 124c may submit a search query comprised of the terms "cellular phone." The request from the client device 124a, 124b and

124*c* may be delivered, via the network 122, to the content provider 102 that delivers the term to the search engine 116. The search engine 116 is operative to query the index 120 to locate one or more items of content responsive to the given request in the content provider 102 content source 110. Alternatively, or in conjunction with the foregoing, the search engine may be operative to locate one or more items of content responsive to the request from one or more remote content sources 108*a* and 108*b*. The one or more items retrieved responsive to a given search request may be used to construct a web page. The content retrieved from local content source 110 or remote content sources 108*a* and 108*b* may also comprise one or more web pages. The search engine is operative to locate one or more web pages responsive to a given request received from a client device 124*a*, 124*b* and 124*c*.

The one or more web pages or one or more items of content retrieved in response to a given request from a client device 124*a*, 124*b* and 124*c* are delivered to the content provider 102 object component 106. According to one embodiment of the invention, the object component 106 is operative to receive one or items of content and construct one or more objects corresponding to the one or more items to be displayed in a given web page. According to another embodiment of the invention, the object component 106 is operative to parse a web page to extract the one or more items of content comprising the web page. For example, the object component 106 may use HTML tags of a web page to identify the one or more items of content comprising the web page.

The object component 106 constructs objects for the one or more sections of a given web page. For example, the object component 106 may construct an object representing items appearing in the top, left, right, center, and bottom of a given web page. According to another embodiment of the invention, the object component 106 constructs an object for each type of data item in a given web page. For example, the object component 106 may be operative to identify the one or more data items comprising a given web page wherein data items comprising a web page may include content, links, advertisements, toolbars, etc. The object component 106 may be operative to construct an object for the one or more types of data items comprising a given web page. According to yet another embodiment of the invention, the object component 106 is operative to construct an object for the one or more items comprising a given web page. For example, a web page may comprise four advertisements, ten items of content ranked in a list, etc. The object component 106 may be operative to construct an object for each identified item of a given web page. Those of skill in the art recognize other methods for dividing a given web page that fall within the scope of the invention.

The one or more objects constructed by the object component 106 are combined to form a visual surrogate corresponding to the web page to be displayed to a given client device 124*a*, 124*b* and 124*c*. The web page comprised of the one or more items of content from content sources 110 or 108*a* and 108*b* and the visual surrogate corresponding to the web page are delivered to the client device 124*a*, 124*b* and 124*c* that initiated the request.

It should be noted that while FIG. 1 illustrates the remote construction of a visual surrogate, according to another embodiment of the invention, a visual surrogate may be constructed locally on a given client device 124*a*, 124*b* and 124*c* based upon the one or more items of content comprising a web page delivered to a given client device 124*a*, 124*b* and 124*c*.

A user of a client device 124*a*, 124*b* and 124*c* may interact with the visual surrogate corresponding to the retrieved webpage to effectuate changes in the webpage. For example, a user of a client device 124*a*, 124*b* and 124*c* may alter the position of one or more objects comprising a visual surrogate. The changes made to the position of the one or more objects comprising a visual surrogate are reflected in the corresponding web page. According to one embodiment of the invention, a request is sent to the content provider 102 to deliver a new web page corresponding to the one or more modifications made to the visual surrogate. According to another embodiment of the invention, a client device 124*a*, 124*b* and 124*c* generates a modified web page reflecting the changes made to the visual surrogate.

Similarly, a user of a client device 124*a*, 124*b* and 124*c* may turn off the display of one or more objects. For example, a user may want to eliminate all advertisements from a given web page. An objected turned off in a visual surrogate is likewise not displayed in the corresponding webpage. A user may subsequently turn on a given object to redisplay the object turned off. According to yet another embodiment of the invention, a user may alter the font or style of one or more objects of a visual surrogate, thereby altering the displayed font or style of one or items of a given web page.

The system illustrated in FIG. 1 may further be used to construct a web page comprised of one or more items of content that allows a user to navigate the webpage without having to view or access a plurality of pages. For example, a user of a client device 124*a*, 124*b* and 124*c* may submit a search query for the term "notebook computer." The search engine 116 may locate hundreds or thousands of items of content responsive to the user request, which may be ranked according to relevancy. However, instead of delivering a plurality of web pages comprised of ranked items, requiring a user to traverse several web pages, the one or more items retrieved responsive to the request may be delivered to the object component 106. The object component is operative to construct an object for the one or more items of content received to construct a corresponding visual surrogate. The object component 106 is further operative to deliver a web page comprised of content items displayed in a manner that allows a user to navigate the web page without having to traverse a plurality of web pages. Using the visual surrogate, a user of a client device 124*a*, 124*b* and 124*c* may navigate throughout the visual surrogate to a desired result in the given web page. For example, a user of a client device 124*a*, 124*b* and 124*c* may use a pointing device, such as a mouse, to move throughout a visual surrogate to locate a desired content item. As a user moves throughout the visual surrogate, the user's movements are reflected in the corresponding web page.

The one or more visual surrogates delivered to a client device 124*a*, 124*b* and 124*c* may be saved by a user for later retrieval. According to one embodiment of the invention one or more visual surrogates may be stored locally on a client device 124*a*, 124*b* and 124*c*. According to another embodiment of the invention, one or more visual surrogates may be stored by the content provider 102. Visual surrogates that are stored on a client device 124*a*, 124*b* and 124*c* or in the content provider 102 may be viewed, retrieved and modified by a given user.

Figure 2:
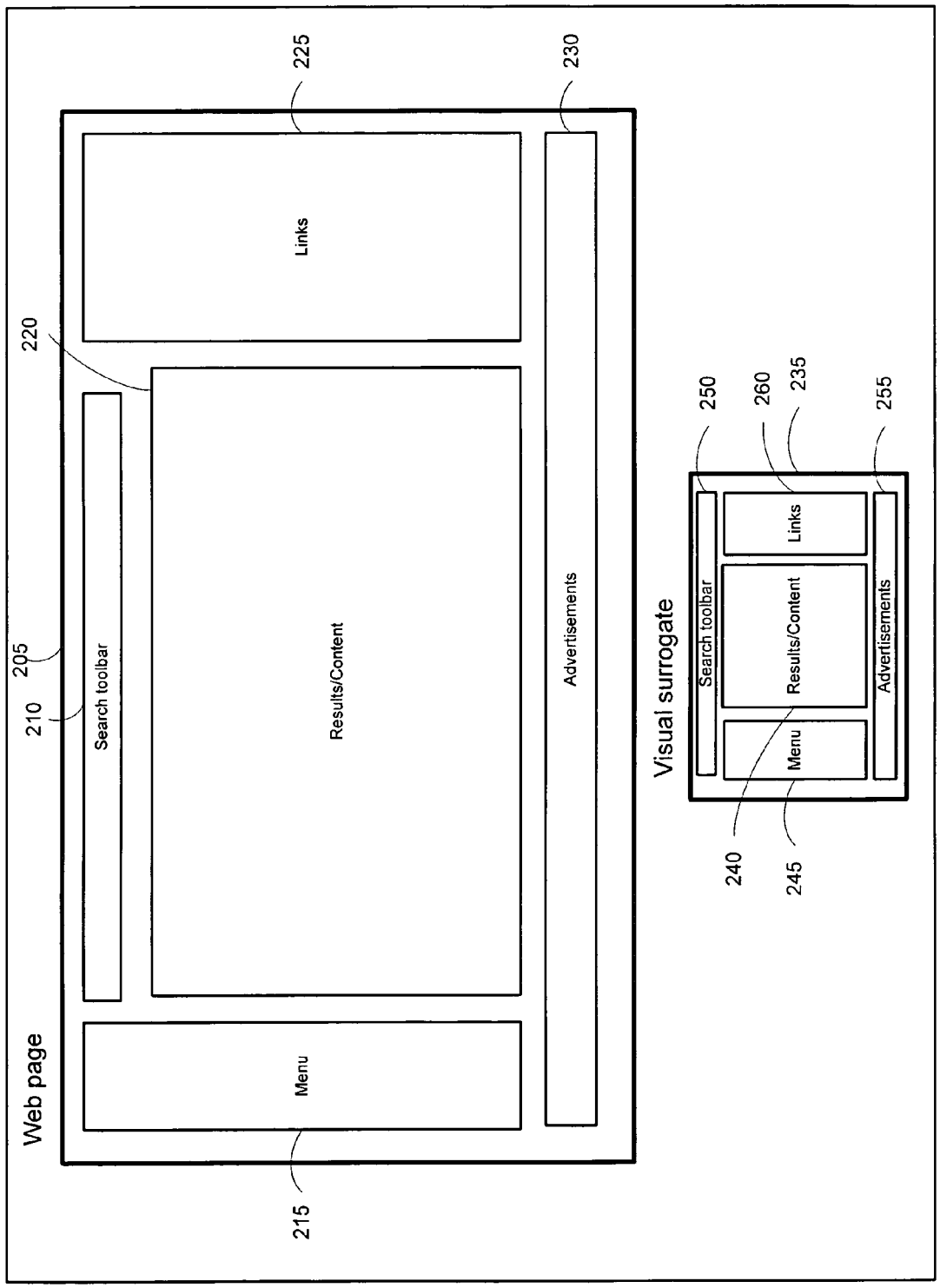
FIG. 2 is a block diagram presenting a web page and a corresponding visual surrogate according to one embodiment of the present invention.

FIG. 2 presents a block diagram illustrating one embodiment of a web page and a corresponding visual surrogate. The webpage 205 comprises a search toolbar 210, content 220, links 225, advertisements 230 and a menu 215. The visual surrogate 235 illustrated in FIG. 2 corresponds to the illustrated web page 205 and provides a visual representation of the one or more items comprising the web page 205. According to one embodiment of the invention, the one or more items 210, 215, 220, 225 and 230 comprising a web page 205 are used to construct a visual surrogate that may be modified by a user in one or more ways.

The visual surrogate 235 illustrated in FIG. 2 contains objects 240, 245, 250, 255 and 260 corresponding to the one or more items comprising the web page 205, namely, a search toolbar 210, links 225, advertisements 230, results/content 220 and a menu 215. According to one embodiment of the invention, an object is constructed for the one or more types of content comprising a given web page. For example, as illustrated in FIG. 2, an object is constructed for results/content 220, links 225, advertisements 230, the menu 215 and the search toolbar 210. According to another embodiment of the invention, the objects comprising a visual surrogate may be constructed based upon the one or more data items comprising a given web page 205. For example, the web page 205 may contain several advertisements, links, menu items, etc. An object may be constructed for each of the one or more items comprising a given web page and accordingly displayed in a corresponding visual surrogate 235. Changes made to the visual surrogate 235 are reflected in the corresponding web page 205. According to one embodiment of the invention, a request is made for a web page displayed according to the changes made to the visual surrogate 235. According to another embodiment of the invention, a client device may generate a modified web page 205 reflecting the changes made to the visual surrogate 235.

Figure 3:
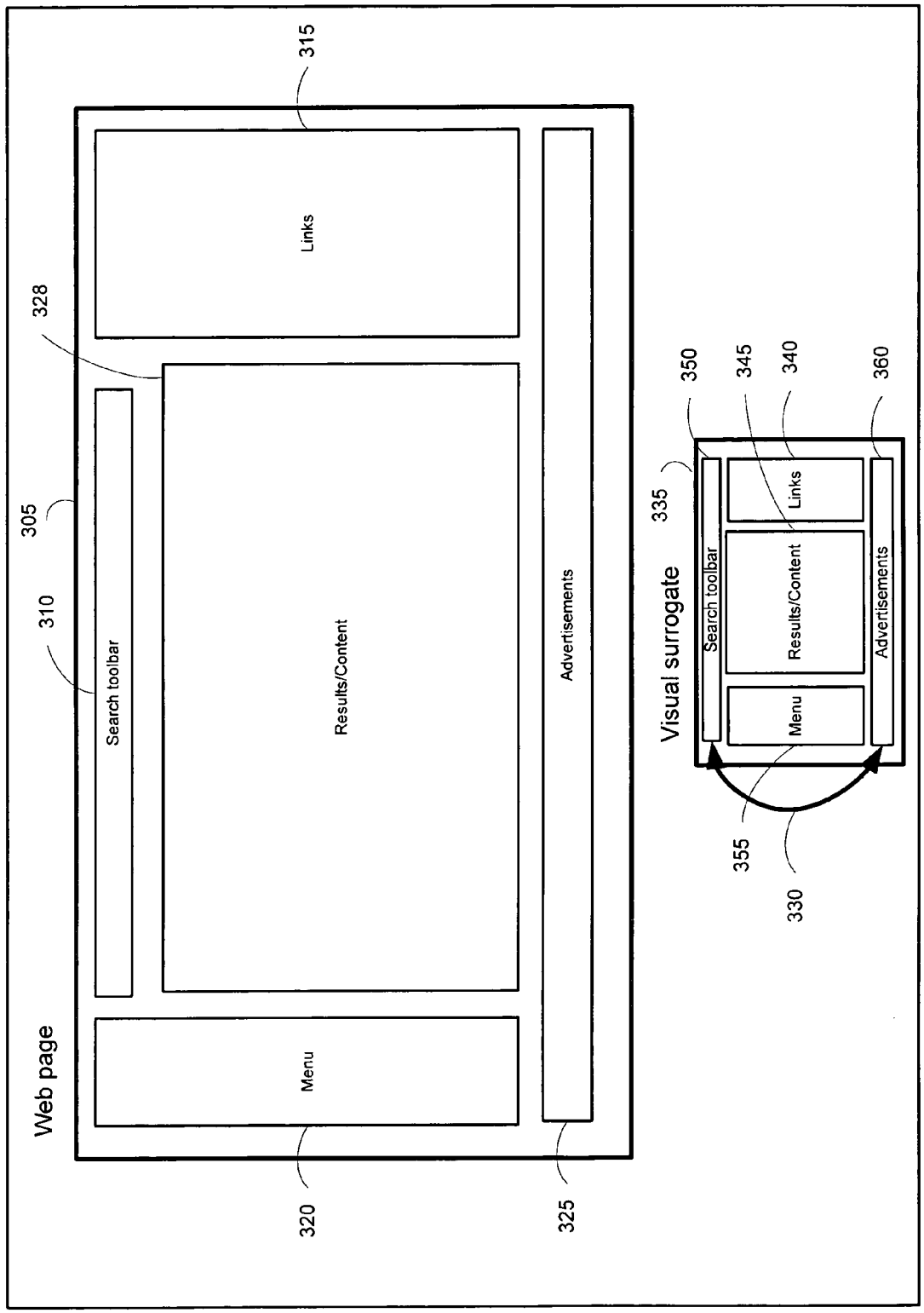
FIG. 3 is a block diagram illustrating a modification to a visual surrogate that is reflected in a corresponding web page according to one embodiment of the present invention.

FIG. 3 presents a block diagram illustrating one embodiment of a web page 305 modified based upon a user's interactions with a corresponding visual surrogate 335. The web page 305 comprises a search toolbar 310, a menu 320, links 315, advertisements 325 and results/content 340 responsive to a given request. The visual surrogate 335 corresponding to the web page 305 contains objects 340, 345, 350, 355 and 360 corresponding to the items in the web page 305, namely, a search toolbar, a menu, results/content, links and advertisements.

Changes made to the visual surrogate 335 are reflected in the corresponding web page 305. According to the embodiment illustrated in FIG. 3, a user may alter the position 330 of the search toolbar 310 and advertisements 325 in the web page using the visual surrogate 335. The position of the search toolbar object and advertisement object of the visual surrogate are switched 330 and the switch in position made in the visual surrogate 335 is reflected in the web page resulting in the advertisements 325 being displayed at the top of the web page and the search toolbar 310 being displayed at the bottom of the web page. According to one embodiment of the invention, a user may switch the position of one or more objects of a visual surrogate by using pointing or selection devices known to those of skill in the art, such as a mouse, to drag one object of a visual surrogate to an alternate location within the visual surrogate.

The size and shape of the one or more areas 310, 315, 320, 325 and 328 in a web page and corresponding visual surrogate may vary. For example, the size and shape of the links 315 area differs from the size and shape of the advertisements 325 area. A user may desire to position the links 315 area at the bottom of a web page 305 and place the advertisements 325 area in the links 315 position of the web page 305. Simply switching the position of the links 315 area with the advertisements 325 area, however, may not be adequate, as the size and shape of these areas may vary. According to one embodiment of the invention, the dimensions of an area are retrieved in order to properly resize the area when it is repositioned. According to another embodiment of the invention, the dimensions of a web page 305 are retrieved in order to properly resize the web page 305 so that all areas are properly displayed.

Figure 4:
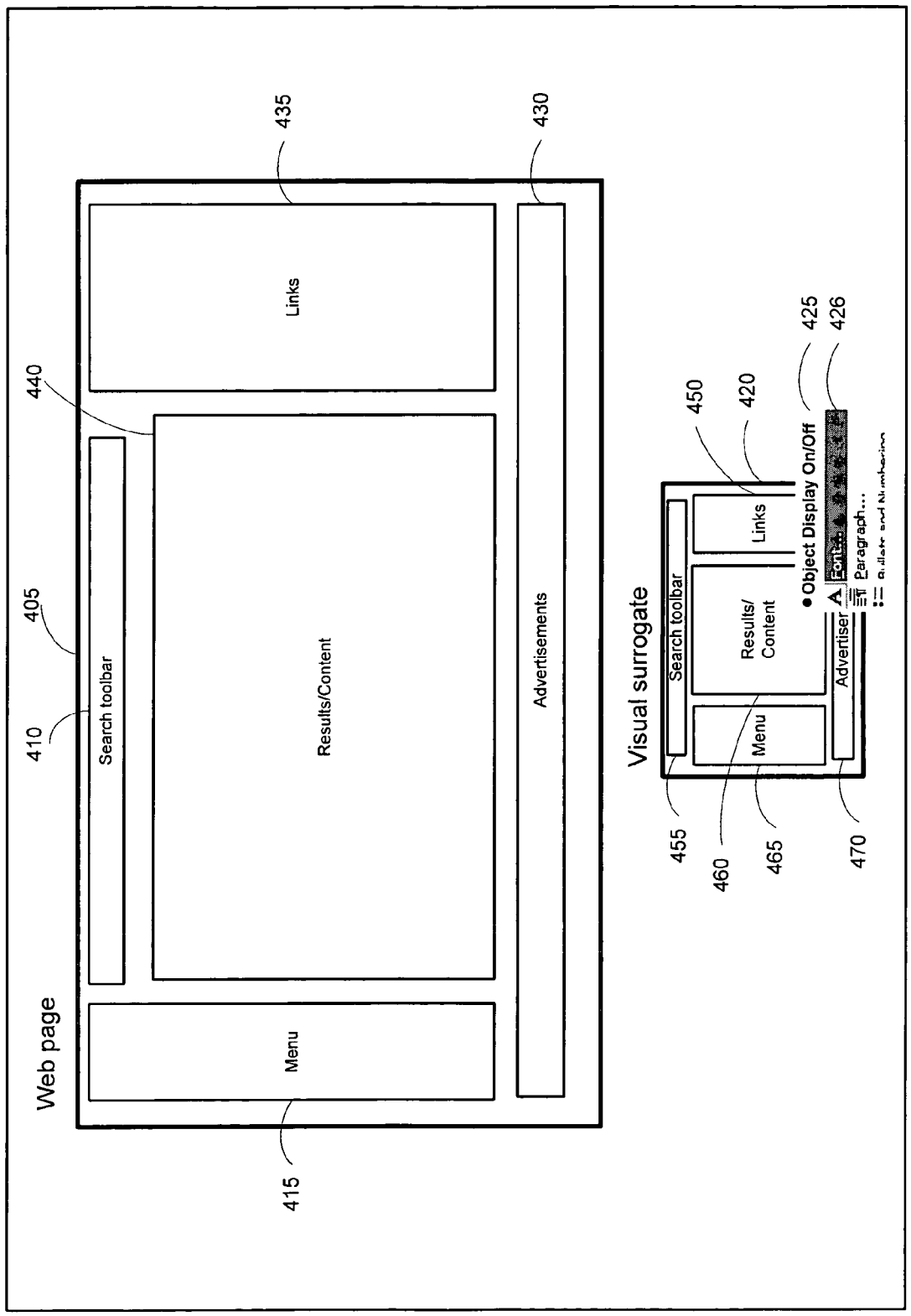
FIG. 4 is a block diagram illustrating a further modification to a visual surrogate that is reflected in a corresponding web page according to one embodiment of the present invention.

FIG. 4 is a block diagram illustrating a further embodiment of a web page 405 modified based upon a user's interactions with a corresponding visual surrogate 420. The one or more items within the web page 405 may comprise links 435, advertisements 430, a search toolbar 410, a menu 415 and results/content 440 responsive to a given request. The one or more items of a given web page may be comprised of text, images, etc.

The one or more items 410, 415, 430, 435 and 440 comprising a given web page are displayed in a corresponding visual surrogate. A user may interact with the one or objects 450, 455, 460, 465 and 470 of a visual surrogate 335 to effectuate changes in a corresponding web page 405. For example, a user viewing a given web page 405 may desire to modify the text displayed in a given area 410, 415, 430, 435 and 440. According to one embodiment of the invention, a user may modify the font of a given object 450, 455, 460, 465 and 470 to thereby effectuate a change in the web page 405 by selecting a given object 450, 455, 460, 465 and 470 and modifying the font property 426 of the object 450, 455, 460, 465 and 470.

A user viewing a web page may further desire to have only one or more areas 410, 415, 430, 435 and 440 of a given web page displayed. For example, a user may want to view only results/content 440 responsive to a given request, and not be distracted with advertisements 430, links 435, etc. According to one embodiment of the invention, a user may turn one or more objects 450, 455, 460, 465 and 470 off, thereby causing the corresponding one more areas 410, 415, 430, 435 and 440 not to be displayed in a given web page 405. Similarly, a user may turn an object 450, 455, 460, 465 and 470 on that was previously turned off to cause the corresponding area 410, 415, 430, 435 and 440 to be displayed in a given web page 405. As illustrated in FIG. 4, a user may select a given object 450, 455, 460, 465 and 470 and modify the "Object display on/off" property 425 of the object 450, 455, 460, 465 and 470 to turn the display of the object 450, 455, 460, 465 and 470 on or off. For example, a user may use a pointing device, such as a mouse to "right click" on an object 450, 455, 460, 465 and 470 in the visual surrogate 420. Right clicking on an object 450, 455, 460, 465 and 470 may allow a user to modify the "Object display on/off" 425 or "Font" 426 property of a given object 450, 455, 460, 465 and 470.

According to one embodiment of the invention, the dimensions of one or more objects 450, 455, 460, 465 and 470 that are turned off are retrieved in order to properly resize the remaining objects 450, 455, 460, 465 and 470. For example, if a user turned off the advertisement 470 and links 450 object, the menu 465, results/content 460 and search toolbar 455 objects may be resized based upon the dimensions of the one or more objects turned off. The resizing performed in the visual surrogate 420 is likewise reflected in the corresponding web page 405. If the objects turned off are subsequently turned on, the one or more objects 450, 455, 460, 465 and 470 comprising the visual surrogate 420 are resized accordingly, and the corresponding areas of the web page 405 are similarly resized.

The system illustrated in FIG. 1 is further operative to retrieve one or more items of content comprising a web page and construct a navigable web page, comprised of the one or more items of content, that may be navigated and modified based upon a user's interactions with a corresponding visual surrogate. Results retrieved in response to a given user's request may be delivered to the object component illustrated in FIG. 1. The object component illustrated in FIG. 1 is operative to generate one or more objects for the one or more results responsive to a given user's request. The object component of FIG. 1 is further operative to generate a web page comprised of the one or more objects and a corresponding visual surrogate.

Figure 5:
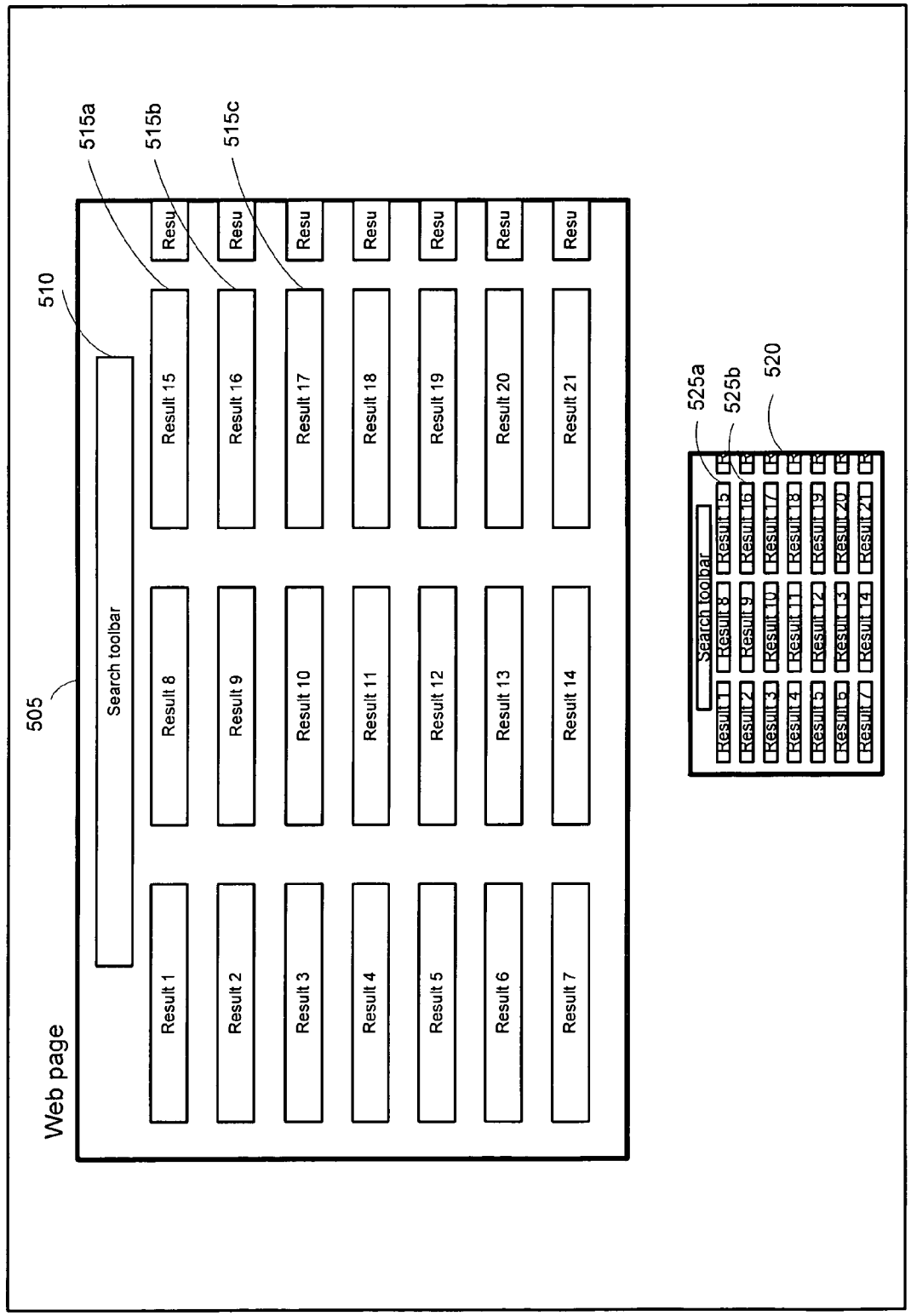
FIG. 5 is a block diagram illustrating a web page and a corresponding visual surrogate that may be used to navigate the web page according to one embodiment of the present invention.

FIG. 5 is a block diagram illustrating one embodiment of a visual surrogate 520 used to navigate a corresponding web page 505 comprised of one or more search results 515a, 515b and 515c. User's of client devices may access various web pages or submit search requests or queries and receive one or more web pages comprised of various results responsive to a given user's request. Current methods for displaying a plurality of results or items of content comprising a web page require users to traverse a plurality of web pages. Viewing a plurality of web pages may require users to spend significant time waiting for a subsequent page to load. Furthermore, a user viewing one page from a plurality of web pages may only see the number of results or content a given web page is operative to display. For example, results responsive to a given user's request may be ranked according to relevance or any other type of known ranking technique. The web page displaying the ranked results, however, may be operative to display only a fraction of the numerous results responsive to the given request. Thus, a user may be capable of viewing only the results that a web page is operative to fit on any given web page.

The web page 505 and visual surrogate 520 may be delivered to a client device. A user may navigate the web page 505 using the corresponding visual surrogate 520. According to one embodiment of the invention, a user may use a pointing device, such as a mouse, to move throughout the visual surrogate 520. A given user's movements throughout a visual surrogate 520 are reflected in the corresponding web page 505. According to another embodiment of the invention, a user may use a visual surrogate's 520 directional buttons (not displayed) to move throughout a given visual surrogate 520 and corresponding web page 505.

The web page 505 may also be modified based upon a user's interactions with the corresponding visual surrogate 520. The web page 505 is comprised of results 515a, 515b and 515c and a search toolbar 510. A user may desire to modify the position of the search toolbar 510 of the web page 505. For example, a user may want to place the search toolbar 510 at the bottom of the web page 505 or modify the position of one or more results 515a, 515b and 515c in the web page 505. Using the corresponding visual surrogate 520, a user may modify the position of the one or more results 515a, 515b and 515c of a given web page 505. Changes made to the one or more objects 525a and 525b of a visual surrogate 520 are reflected in the corresponding web page 505.

Figure 6:
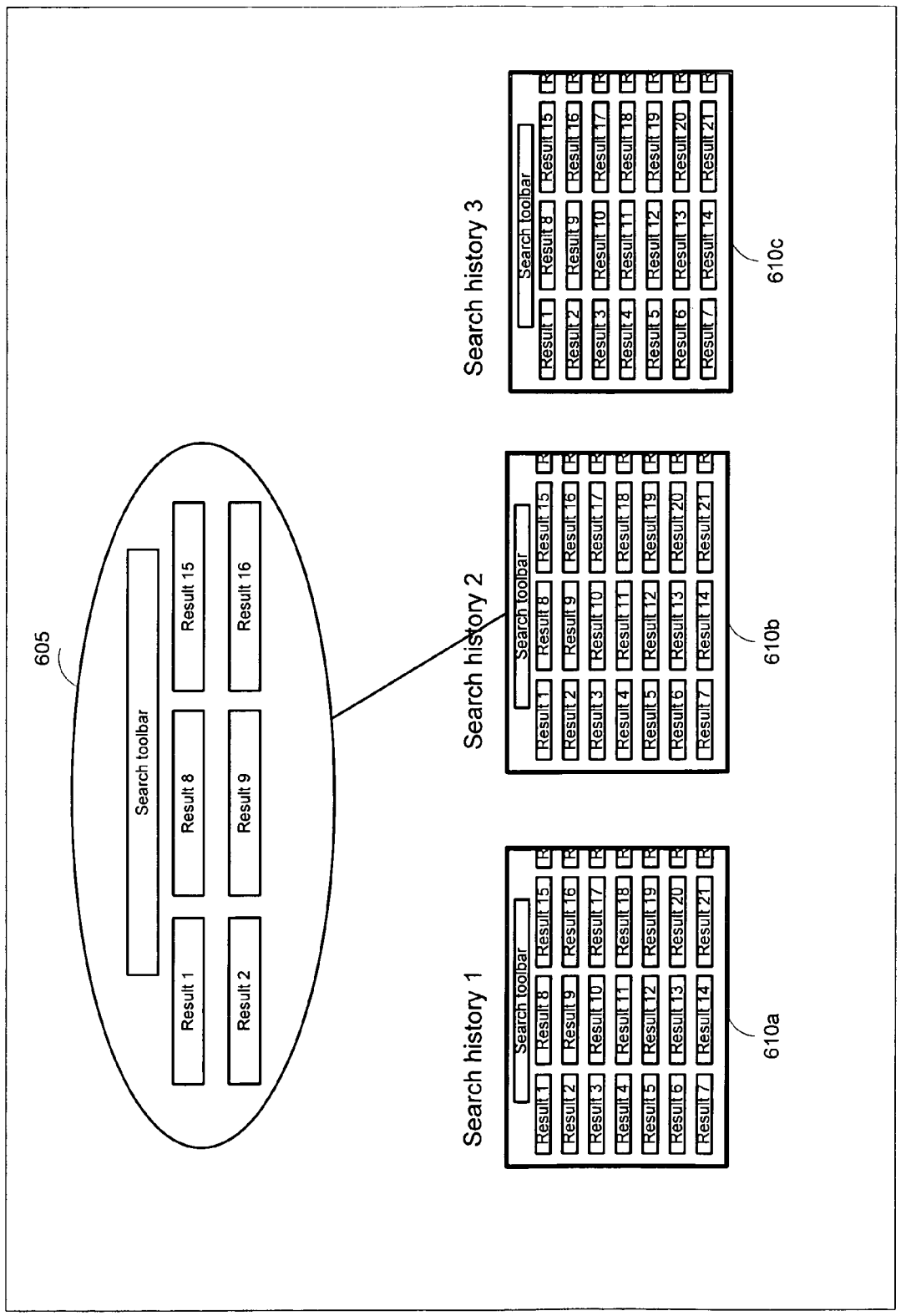
FIG. 6 is a block diagram presenting a plurality of visual surrogates saved by a user corresponding to one or more previous requests for content according to one embodiment of the present invention.

FIG. 6 is a block diagram illustrating one embodiment of one or more visual surrogates that may be saved, viewed and retrieved by a given user of a client device. A user of a client device may submit one or more search requests or queries to a search engine. The one or more requests submitted by a given user may comprise various results that are used to construct one or more visual surrogates 610a, 610b and 610c. A user may desire to save the one or more visual surrogates 610a, 610b and 610c for later viewing and retrieval. For example, a user may submit one search request for "notebook computer," another search request for "laptop computer," and a further search request for "portable computer." Each request may result in the retrieval of information comprised of one or more results to be displayed in a given web page. However, while the terms "notebook computer," "laptop computer" and "portable computer" may be related, the one or more results retrieved in response to each request may be different. As such, the one or more visual surrogates 610a, 610b and 610c constructed corresponding to each respective web page will vary. A user may want to save the one or more visual surrogates 610a, 610b and 610c within a data store for later viewing, comparison, etc.

One or more saved visual surrogates 610a, 610b and 610c may be retrieved from a data store and displayed to a user of a client device. A user may traverse the one or more saved visual surrogates 610a, 610b and 610c saved locally on a client device or remotely on a storage structure, and retrieve one or more of the visual surrogates 610a, 610b and 610c. As illustrated in FIG. 6, a user may have one or more saved visual surrogates 610a, 610b and 610c. According to one embodiment of the invention, a user may traverse one or more saved visual surrogates 610a, 610b and 610c with a pointing device, such as a mouse. As a user moves over a given saved visual surrogate 610b, a magnified view 605 of the one or more objects comprising the visual surrogate may be displayed. A user may interact with the one or more saved visual surrogates 610a, 610b and 610c retrieved according to the methods described herein.

According to another embodiment of the invention, a user may also perform a comparison of the plurality of saved visual surrogates 610a, 610b and 610c. For example, a user may submit a plurality of related search requests to a search engine. The results retrieved in response to each respective search request may be used to construct one or more corresponding visual surrogates. A user may wish to compare the results comprising the one or more visual surrogates 610a, 610b and 610c. According to one embodiment of the invention, a user may perform a comparison of two or more visual surrogates 610a, 610b and 610c to identify one or more differences with respect to the results retrieved in response to one or more search requests. According to another embodiment of the invention, a user may perform a comparison of two or more visual surrogates 610a, 610b and 610c to identify one or more differences with respect to the ranking of the one or more results retrieved in response to one or more search requests. Those of skill in the art recognize other comparisons that may be performed with respect to two or more visual surrogates.

Figure 7:
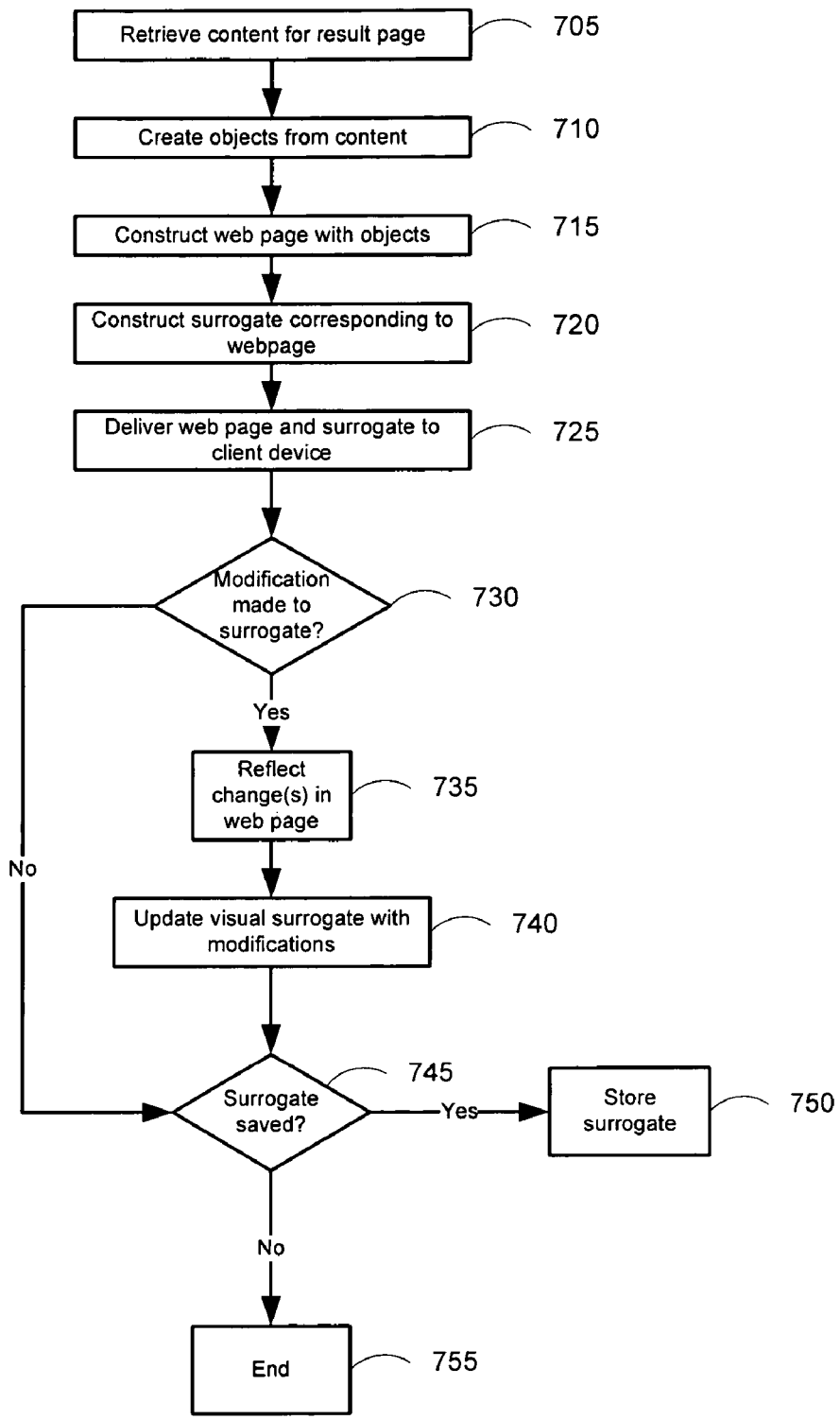
FIG. 7 is a flow diagram presenting a method for retrieving content comprising a web page and generating a corresponding visual surrogate according to one embodiment of the present invention.

FIG. 7 is a flow diagram illustrating one embodiment of a method for constructing a web page and corresponding visual surrogate comprised of one or more objects. Content responsive to a given request is retrieved for the one or more web pages to be displayed to a given user, step 705. According to one embodiment of the invention, content retrieved may comprise advertisements, text, links, banners, etc. According to another embodiment of the invention, content retrieved may comprise one or more web pages. Objects are generated for the one or more items of content retrieved, step 710, and a web page is constructed using the one or more objects generated, step 715. For example, one or more objects may be generated for the one or more advertisements, text, links, banners, etc., retrieved. Similarly, the one or more items comprising a web page may be extracted, using HTML tags, to generate one or more objects. A visual surrogate comprised of the one or more objects corresponding to the web page is also generated 720 and delivered along with the web page to a client device 725.

A recipient of a web page and corresponding visual surrogate may modify the visual surrogate in one or more ways as described herein. A check is performed to determine whether any modifications were made to the visual surrogate, 730. If a modification was made to the visual surrogate, the modification is reflected in the corresponding web page, step 735. Additionally, the visual surrogate is displayed with the corresponding modifications, step 740. If no modifications were made to the visual surrogate, or after all modifications have been made and reflected in the corresponding web page, a check is performed to determine whether the visual surrogate is to be saved, step 745. If a user elects to save the visual surrogate, the visual surrogate is stored, either locally on a client device, or remotely on a storage structure operative to store one or more visual surrogates, step 750. Alternatively, if the check performed to save a visual surrogate evaluates to false, the visual surrogate is not saved.

Figure 8:
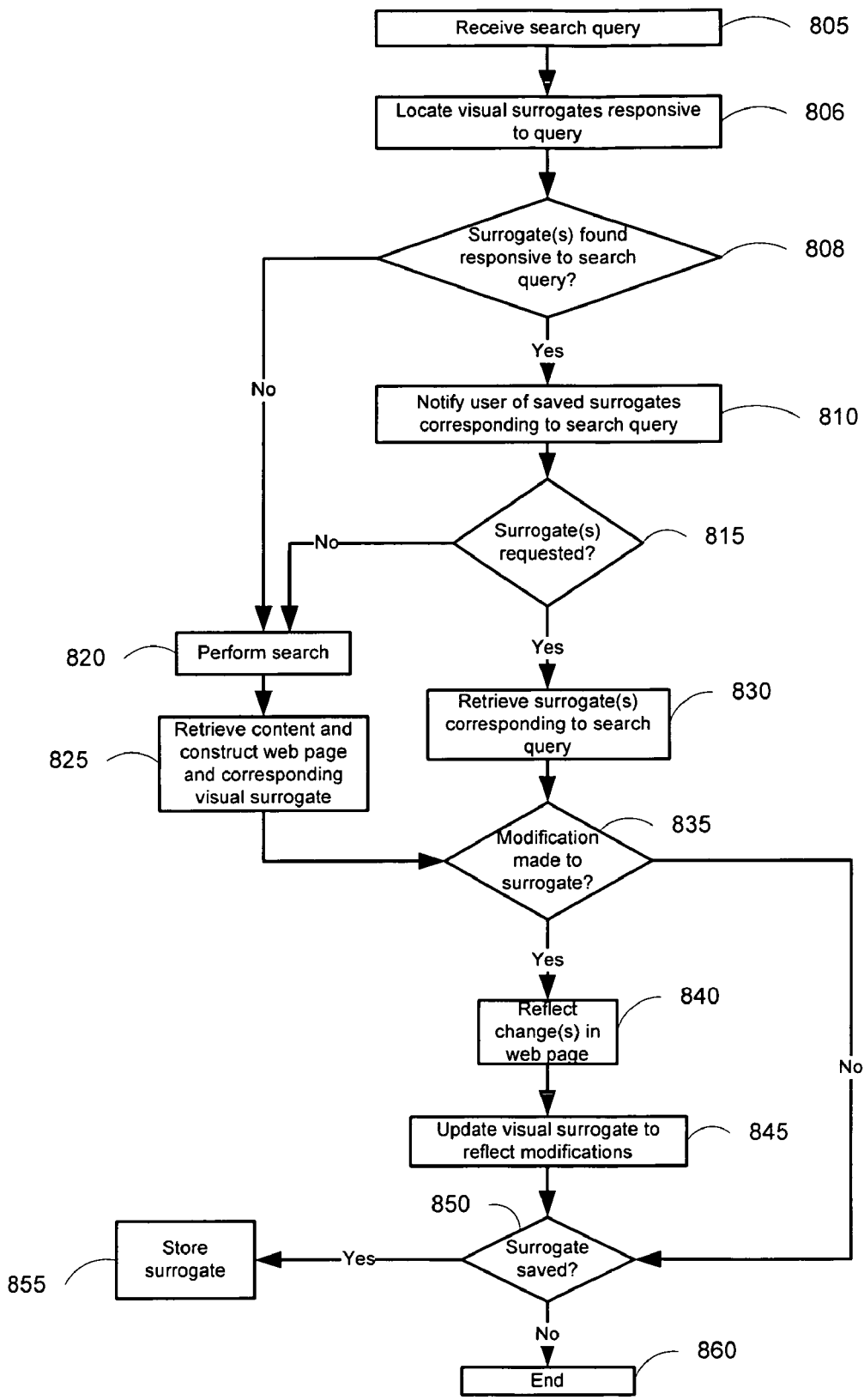
FIG. 8 is a flow diagram presenting a method for locating and retrieving saved visual surrogates in response to a user search query according to one embodiment of the present invention.

As illustrated in FIG. 7, a user may elect to save one or more visual surrogates corresponding to a given search query. Thereafter, a user may choose to retrieve the one or more saved visual surrogates corresponding to a given search query. FIG. 8 is a flow diagram illustrating one embodiment of a method for retrieving one or more visual surrogates responsive to a given search query. A user of a client device may submit one or more search queries to a search engine that may retrieve one or more results responsive to the given user's search query, step 805. A web page and visual surrogate comprised of the one or more objects corresponding to the one or more results may be generated and displayed to the user. Alternatively, a search may be performed to retrieve visual surrogates that were previously saved by a user either locally on a client device or remotely on a storage device capable of storing one or more visual surrogates. For example, a user of a client device may submit a search query comprised of one or more terms to a search engine. The search engine may retrieve one or more results that are responsive to a given search query. A web page comprised of the one or more results may be generated as well as a corresponding visual surrogate.

The search query is used to search for one or more saved visual surrogates responsive to the given query, step 806. A check is performed to determine whether one or more visual surrogates responsive to the search query received are found, step 808. If one or more visual surrogates responsive to the given search query are located, a user is notified of such, step 810. A user may request one or more of the saved visual surrogates located in response to the given search query. A check is performed to determine whether a user requested the one or more saved visual surrogates located in response to the given search query, step 815. If a user requests one or more of the saved visual surrogates, the saved visual surrogates responsive to the given search query are retrieved and displayed to the given user, step 830. Alternatively, if a user elects not to retrieve any of the one or more saved visual surrogates, or if no saved visual surrogates are found responsive to the given search query, a search is performed for one or more items of content responsive to the given search query, step 820. Content responsive to the given search query is retrieved and used to generate a web page and corresponding visual surrogate, step 825.

The one or more saved visual surrogates or visual surrogate constructed and displayed to a given user may be modified in one or more ways. A check is performed to determine whether a user made any modifications to the one or more visual surrogates displayed to the user, step 835. If one or more modifications are made to the one or more visual surrogates, the modifications are reflected in the respective web page, step 840. According to one embodiment of the invention, if one or more modifications are made to the visual surrogate, a request is generated for a new web page reflecting the modifications made to the corresponding visual surrogate. According to another embodiment of the invention, a client device generates a modified web page reflecting the changes made to the visual surrogate. The visual surrogate corresponding to the web page is also displayed with the modifications made by the user, 845. If no modifications were made to the one or more visual surrogates, or after all modifications have been made and reflected in the appropriate web pages, a check is performed to determine whether a user wishes to save the one or more visual surrogates, step 850. If a user elects to save the one or more visual surrogates, the visual surrogates are stored either locally on a client device or remotely on a storage device capable of storing one or more visual surrogates, step 855. If the check at step 850 evaluates to false and a user does not wish to save any of the one or more visual surrogates, the visual surrogates are not saved, step 860.

As discussed above, embodiments of the present invention may also be used to generate one or more objects corresponding to "real world objects," wherein real world objects may comprise items of data identifying individuals, email addresses, cellular phones, facsimile machines, etc. Various computer programs, such as Microsoft's Outlook, address book applications, Rolodex applications, etc., may store various items of data corresponding to real world objects. Such data may be used to contact individuals, deliver information, arrange meetings, etc. Existing methods, however, require users to interact with a plurality of applications or items of data to perform such tasks. Accordingly, systems and methods of the present invention allow a user to interact with one or more visual surrogates and one or more objects corresponding to real world objects to deliver data, organize meetings, etc.

Figure 9:
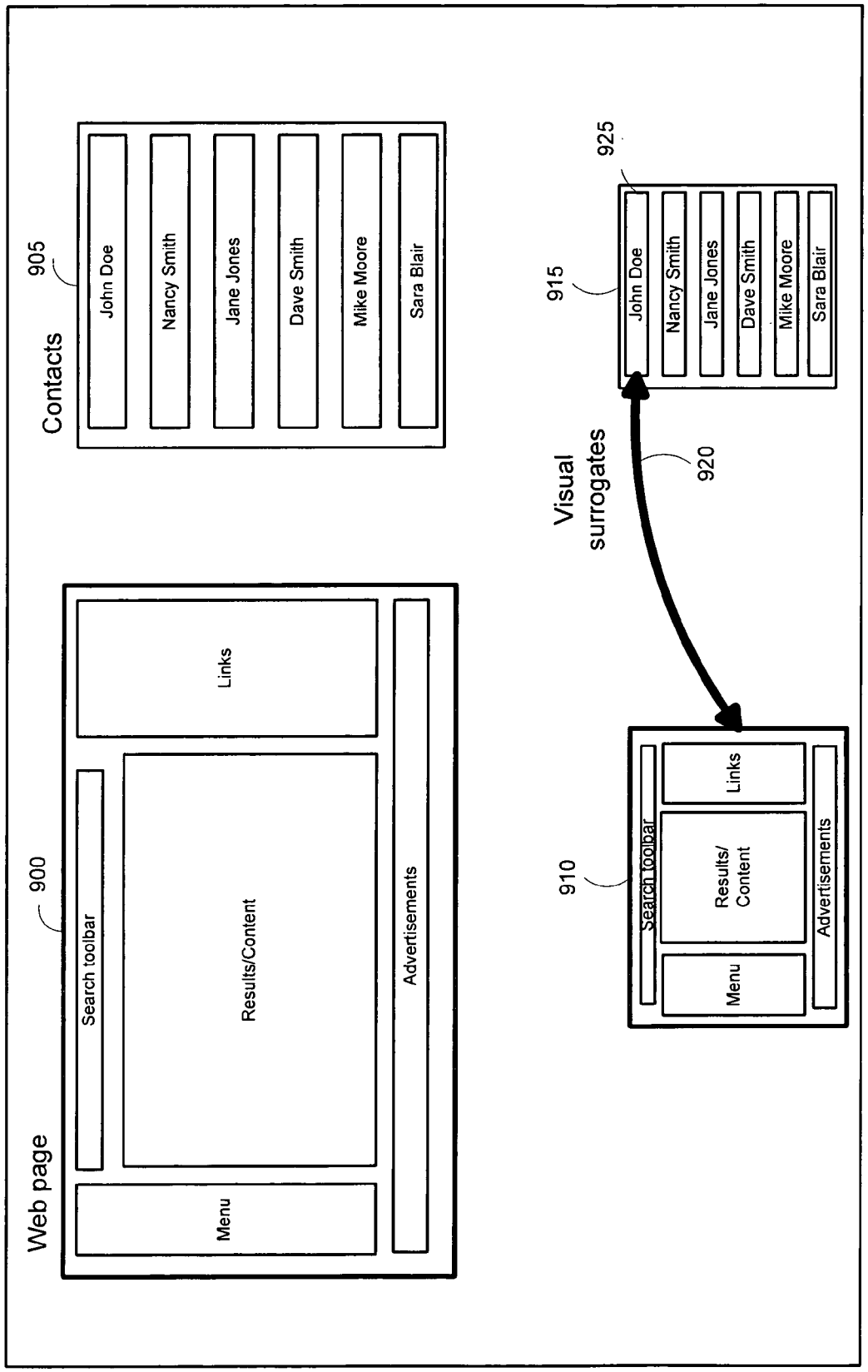
FIG. 9 is a block diagram presenting an application used to store contact information, a corresponding visual surrogate and a visual surrogate corresponding to a web page according to one embodiment of the present invention.

FIG. 9 is a block diagram illustrating one embodiment of a method for using one or more objects and one or more visual surrogates to deliver data. An application, such as a Rolodex or address book application, may store a plurality of data identifying one or more individuals and contact information for such individuals. A user of the system illustrated in FIG. 1 may utilize the data maintained by an existing address book or similar application to generate one or more objects corresponding to the data stored by such applications. As illustrated in FIG. 9, a user may store data identifying contact information 905 for a plurality of individuals. The system illustrated in FIG. 1 is operative to generate objects corresponding to the one or more contacts 905 stored in an address book or similar application. The one or more objects corresponding to a user's contacts 905 may be used to generate a corresponding visual surrogate 915.

According to the methods illustrated and described herein, a user may also receive one or more visual surrogates 910 corresponding to one or more web pages 900. A user may desire to deliver the information in a web page 900 to a contact 905 stored in an address book or similar application. As illustrated in FIG. 9, a user may select a visual surrogate 910 using a pointing device such as a mouse, and drag the visual surrogate 920 to an object 925 corresponding to a user's contact. Combining the web page visual surrogate 910 with a contact object 925 results in the delivery of the data maintained by a given web page to the respective contact. According to one embodiment of the invention, combining two or more visual surrogates or objects invokes an application operative to deliver the data. For example, combining the web page visual surrogate 910 with a contact object 925 may automatically invoke an email application, attach the visual surrogate to an email, and deliver the email to the respective contact 925.

Figure 10:
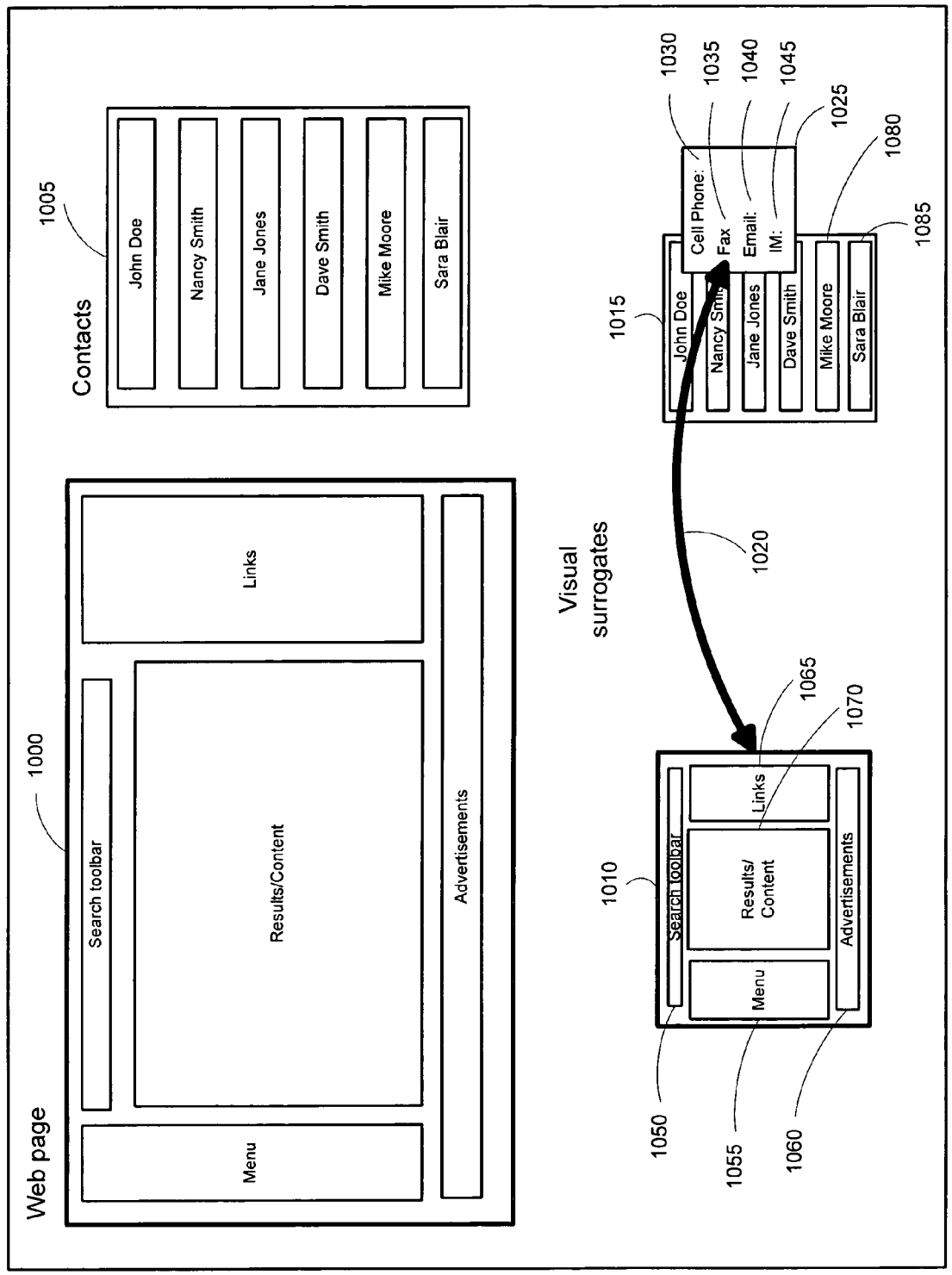
FIG. 10 is a block diagram illustrating the delivery of a visual surrogate to a physical device associated with a contact object according to one embodiment of the present invention.

The present invention further provides a user with the ability to send data to one or more real world objects. FIG. 10 is a block diagram illustrating one embodiment of a method for delivering information using one or more objects 1050, 1055, 1060, 1065 and 1070 comprising a web page visual surrogate and one or more objects comprising a contact visual surrogate. A user may receive a web page 1000 containing various data and a corresponding visual surrogate 1010 comprised of one or more objects 1050, 1055, 1060, 1065 and 1070 corresponding to the data in the web page 1000. A user may also maintain data in an address book or similar application identifying one or more contacts 1005. A user may store a variety of real world object data for a given contact, including information identifying a contact's email address, facsimile number, instant messenger name, cellular phone number, etc. A contact visual surrogate 1015 may be generated comprised of objects 1080 and 1085 corresponding to the one or more contacts 1005. Moreover, real world objects 1030, 1035, 1040 and 1045 may be generated corresponding to the various real world object data identifying the variety of real world objects associated with a given contact.

To deliver a web page visual surrogate to a given contact 1005, a user may combine the web page visual surrogate 1010 with a contact object 1080 and 1085 maintained in a contact visual surrogate 1015. For example, using a pointing device such as a mouse, a user may drag the web page visual surrogate 1010 to a given contact object 1080 and 1085. According to the embodiment illustrated in FIG. 10, a user may deliver a web page visual surrogate 1010 to one or more real world objects 1030, 1035, 1040 and 1045 associated with a given user by combining a web page visual surrogate 1010 with a given real world object 1030, 1035, 1040 and 1045. According to one embodiment of the invention, combining a web page visual surrogate 1010 with a given real world object 1030, 1035, 1040 and 1045 invokes an application operative to deliver the web page visual surrogate 1010 to the respective real world object 1030, 1035, 1040 and 1045. For example, a user may combine a web page visual surrogate 1010 with a given contact object's facsimile object 1035. Combining the web page visual surrogate 1010 with a facsimile object 1035 results in the web page visual surrogate 1010 being facsimiled to the appropriate facsimile number.

Figure 11:
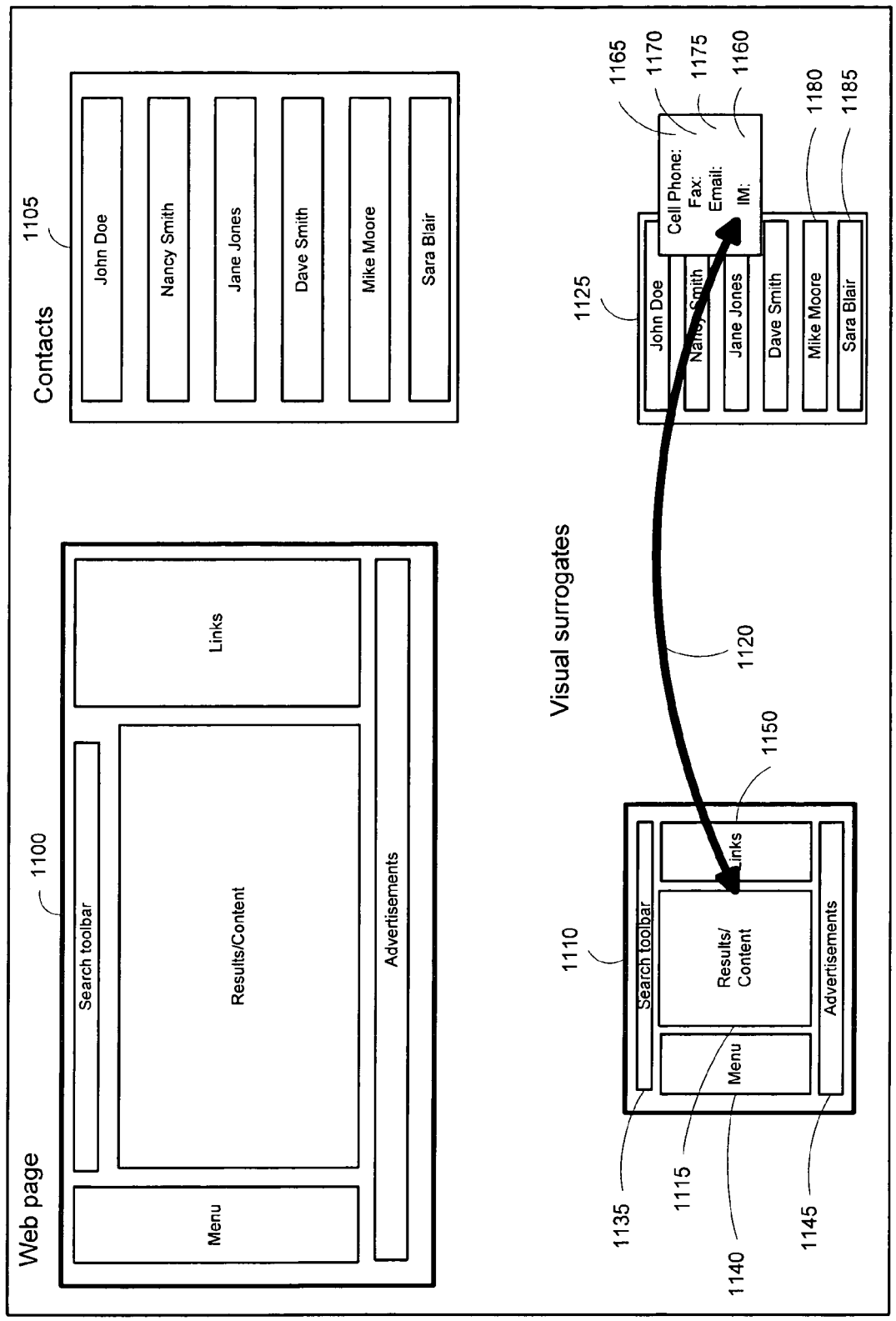
FIG. 11 is a block diagram illustrating the delivery of a single object of a visual surrogate comprised of a plurality of objects according to one embodiment of the present invention.

FIG. 11 is a block diagram illustrating one embodiment of a method for delivering one or more objects 1115, 1135, 1140, 1145 and 1150 of a given web page visual surrogate to one or more real world objects 1160, 1165, 1170 and 1175 associated with a given contact. One or more objects 1180 and 1185 may be generated corresponding to a given user's one or more contacts 1105. Moreover, one or more objects 1160, 1165, 1170 and 1175 may be generated corresponding to the one or more real world objects (email address, instant messenger name, etc.) associated with a given contact 1105. The one or more objects 1080 and 1085 corresponding to a user's one or more contacts 1105 are used to construct a contact visual surrogate 1125.

Additionally, one or more visual surrogates 1110 may be delivered to a user corresponding to a given web page 1100. The visual surrogate 1110 corresponding to a given web page 1100 may be comprised of a plurality of data. A recipient of a web page visual surrogate 1110 may desire to deliver one or more objects 1115, 1135, 1140, 1145 and 1150 comprising a web page visual surrogate to a given contact. A recipient of a web age visual surrogate 1110 may further desire to deliver one or more objects 1115, 1135, 1140, 1145 and 1150 comprising a web page visual surrogate to a particular real world object 1160, 1165, 1170 and 1175 associated with a given contact. As illustrated in FIG. 11, a user may combine one or more objects 1115, 1135, 1140, 1145 and 1150 comprising a web page visual surrogate 1110 with one or more real objects 1160, 1165, 1170 and 1175 associated with a given contact. In the embodiment illustrated in FIG. 11, the results/content object 1115 is combined with an instant messenger ("IM") object 1160. According to one embodiment of the invention, combining two or more objects automatically invokes the appropriate application operative to deliver data to a given real world object 1160, 1165, 1170 and 1175. For example, in the embodiment illustrated in FIG. 11, the combination 1120 of the results/content object 1115 with the instant messenger object 1160 results in an instant messenger application, such as Yahoo!'s Instant Messenger application, instant messaging the results/content 1115 to the instant messenger name associated with the given contact. According to one embodiment of the invention, any of the one or more objects 1115, 1135, 1140, 1145 and 1150 comprising a given web page visual surrogate 1110 may be delivered to any of the one or more real world objects 1160, 1165, 1170 and 1175 associated with a given contact.

Figure 12:
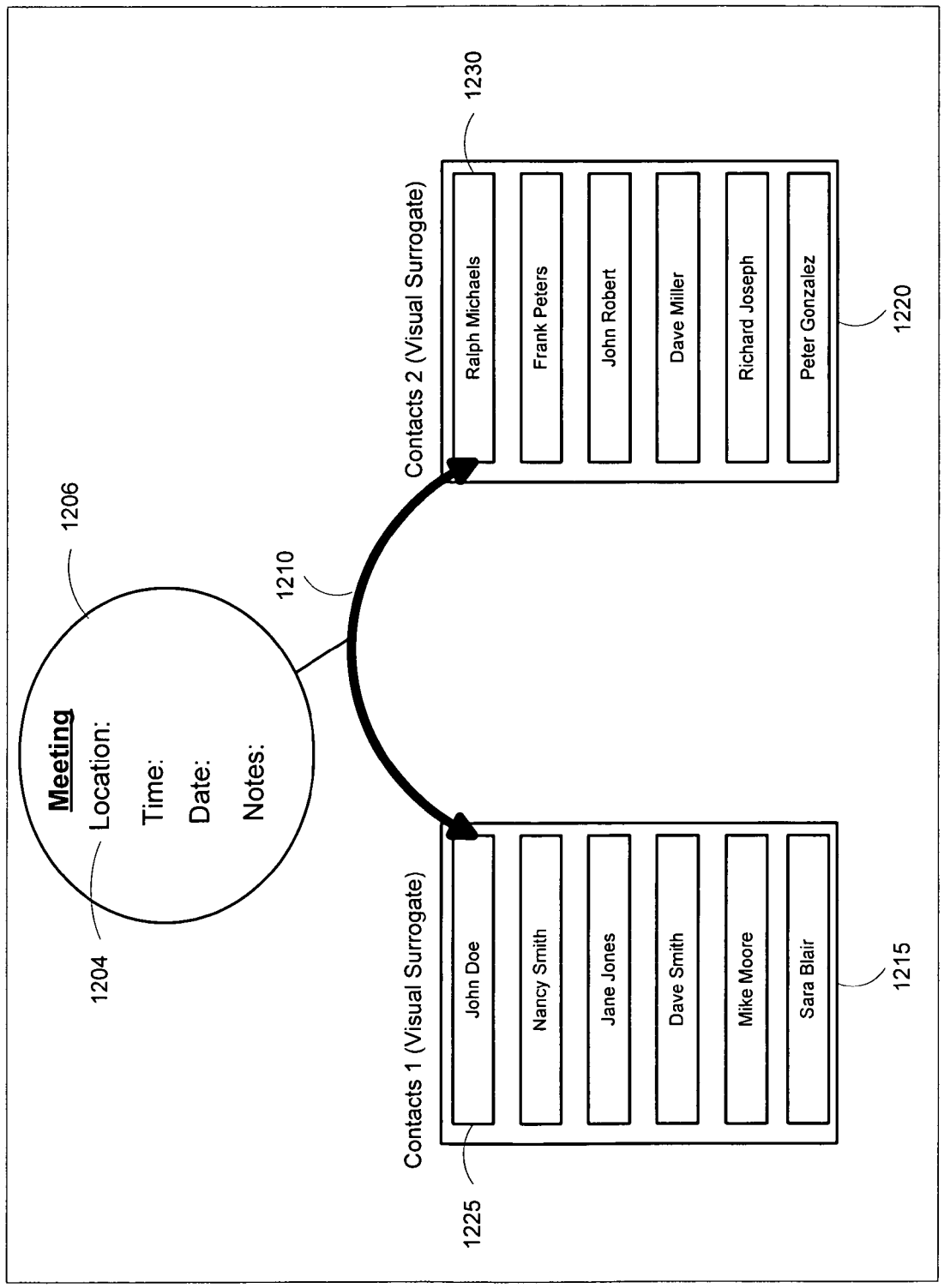
FIG. 12 is a block diagram illustrating the combination of two or more visual surrogate objects according to one embodiment of the present invention.

FIG. 12 is a block diagram illustrating one embodiment of a method for using one or more visual surrogates and corresponding objects to arrange a meeting between two or more contacts of a given user. As illustrated and described herein, one or more contact objects 1225 may be generated corresponding to the one or more individuals stored in a user's address book or similar application. The one or more contact objects generated for a user's one or more contacts may be used to generate one or more contact visual surrogates 1215 and 1220.

A user may have a plurality of contacts in various address book applications and may desire to arrange a meeting 1206 between two or more contacts 1225 and 1230. Using a pointing device such as a mouse, a user may combine 1210 a first contact object from a first visual surrogate 1215 with a second contact object 1230 from a second contact visual surrogate 1220 to arrange a meeting 1206. According to one embodiment of the invention, combining 810 two or more contact objects 1225 and 1230 automatically invokes an application operative to gather one or more items of data 1204 for arranging a meeting 1206, and deliver a message or similar notification to each contact 1225 and 1230 alerting them of the meeting.

Though the methods and systems described herein provide illustrations of objects generated corresponding to contacts and real world items associated with a given contact, those of skill in the art recognize that objects may be generated for a variety of data items.

Figure 13:
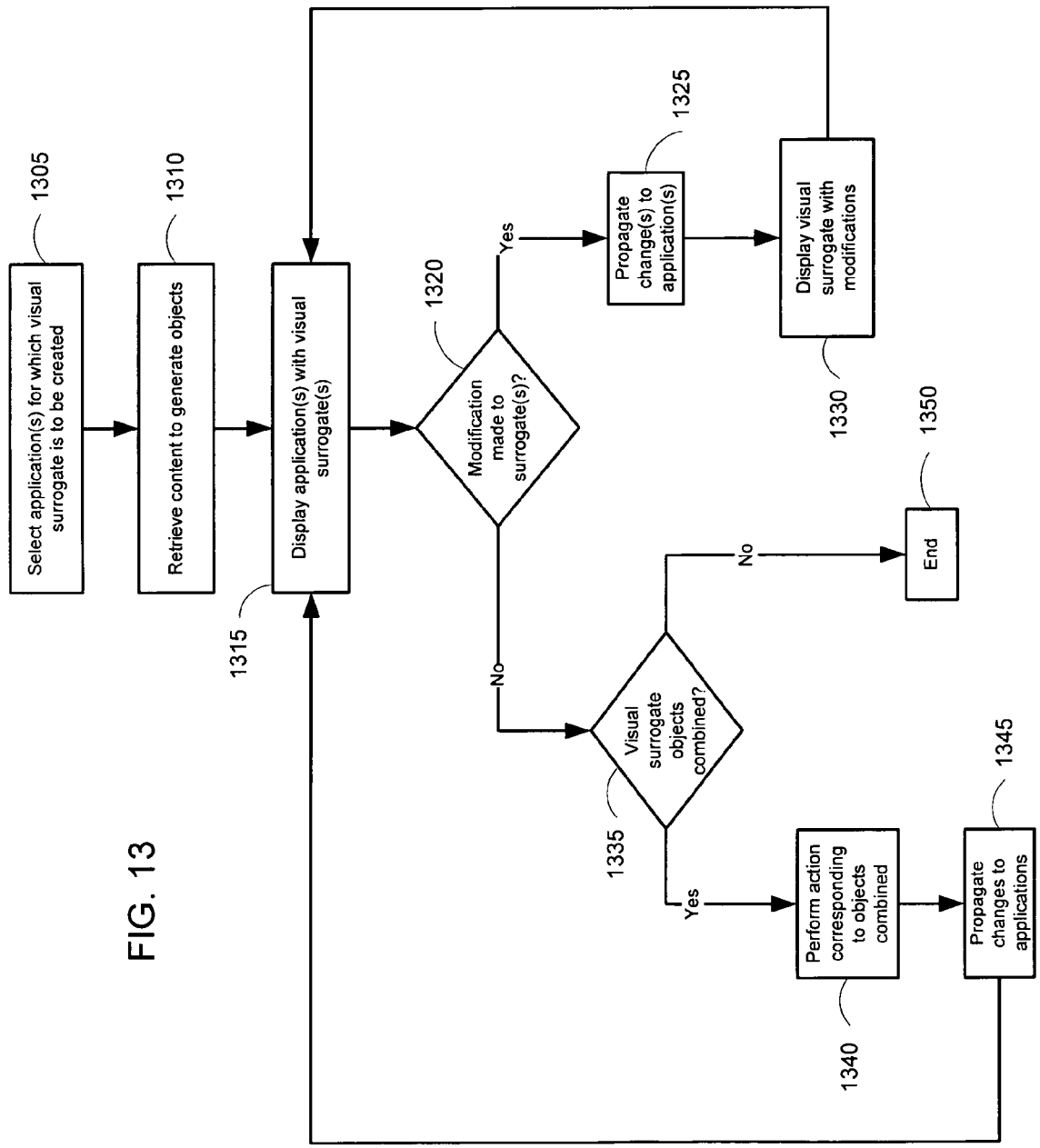
FIG. 13 is a flow diagram presenting a method for generating and interacting with one or more visual surrogates corresponding to one or more applications according to one embodiment of the present invention.

FIG. 13 is a flow diagram illustrating one embodiment of a method for generating one or more visual surrogates comprising one or more objects corresponding to data stored in one or more client device applications representing real world objects. An application containing one or more items of data is selected for which the one or more visual surrogates are to be generated, step 1305. Exemplary applications include address book applications, Rolodex applications, Microsoft's Outlook, etc. One or more objects are generated corresponding to the one or more items of data maintained by the one or more applications, step 1310. For example, an object may be created for the one or more entries in an address book application. The objects are used to construct a visual surrogate, which is displayed in conjunction with the application to a given user of a client device, step 1315.

As described above, a user of client device may modify one or more visual surrogates in one or more ways. A check is performed to determine whether one or more modifications were made to the one or more visual surrogates displayed to a user of a client device, step 1320. If a modification was made to one or more visual surrogates, the modifications are reflected in the respective applications 1325. The visual surrogates are similarly displayed with the respective modifications, step 1330. If no modifications are made to the one or more visual surrogates, or after all modifications have been performed by a given user, a check is performed to determine whether any of the one or more objects comprising the one or more visual surrogates have been combined, step 1335.

If two or more of the objects comprising the one or more visual surrogates are combined, the application corresponding to the combination of the one or more objects is invoked and performs the action associated with the combination of the two or more objects, step 1340. For example, if two or more contact objects are combined, an application may be invoked to arrange a meeting between the two contacts. The action performed by the respective combination is reflected in each of the one or more applications associated with the two or more objects combined, step 1345. For example, as described, combining two contact objects may arrange a meeting between two contacts. An application that maintains information on meetings or appointments, such as Microsoft's Outlook, may be invoked and updated to reflect the meeting arranged. Alternatively, if the check evaluates to false, and no contact objects are combined, no action is performed for each of the one or more objects, step 1350.

While the invention has been described and illustrated in connection with preferred embodiments, many variations and modifications as will be evident to those skilled in the art may be made without departing from the spirit and scope of the invention, and the invention is thus not to be limited to the precise details of methodology or construction set forth above as such variations and modifications are intended to be included within the scope of the invention.

I claim:

1. A computerized method for generating an interactive data structure using one or more items of content for displaying the interactive data structure, the method comprising:
    generating, using a processing device, a plurality of objects, each object corresponding to a visual display of one or more items of content on a web-based interface that includes a search engine interface;
    combining, using the processing device, the objects to form an interactive data structure for displaying the content therein, the interactive data structure for display via the web-based interface;
    delivering the content and interactive data structure to a client device;
receiving one or more modifications made to the one or more objects, the modifications relating to visual display properties of the object relative to the interactive data structure, wherein receiving includes an option to deactivate the display of one or more objects and an option to activate the display of one or more objects;
    propagating the one or more modifications to the objects to update the interactive data structure; and
    employing the interactive data structure to display the one or more items of content in the interactive data structure, including the modifications relating to the visual display, via the web-based interface.

2. The method of claim 1 wherein generating comprises generating one or more objects associated with one or more items of content contained within a document.

3. The method of claim 1 wherein generating comprises generating one or more objects associated with one or more items of content contained within a web page.

4. The method of claim 1 wherein generating comprises generating one or more objects associated with one or more items of content maintained in one or more applications.

5. The method of claim 1 wherein combining comprises combining the one or more objects according to a structure identified by the content associated with the one or more objects.

6. The method of claim 1 wherein delivering comprises delivering the content and interactive data structure in response to a user request.

7. The method of claim 1 wherein receiving comprises receiving a modification made to the positioning of the one or more objects comprising the one or more interactive data structures.

8. The method of claim 1 wherein receiving comprises receiving a modification made to the one or more characters displayed in the one or more objects comprising the one or more interactive data structures.

9. The method of claim 1 wherein receiving comprises receiving a notification of a user's navigation throughout the one or more interactive data structures.

10. The method of claim 1 wherein receiving one or more modifications comprises receiving an indication of a combination of two or more objects.

11. The method of claim 1 comprising modifying the one or more items of content according to the modifications made to the one or more associated objects.

12. The method of claim 1 wherein propagating comprises: identifying an action associated with the one or more modifications; identifying an application operative to execute the identified action; and executing the action through the use of the one or more modifications by the application.

13. A system for facilitating the interaction with one or more items of content via a display of an interactive data structure, the system comprising:
    a search engine operative to retrieve one or more items of content; and an object component operative to, via a processing device:
    generate a plurality of objects, each object corresponding to a visual display of the one or more items of content on a web-based interface that includes a search engine interface associated with the search engine, combine the objects to form an interactive data structure for displaying the content therein, the interactive data structure for display via the web-based interface, transmit the interactive data structure to a client device, receive one or more modifications made to the one or more objects, the modifications relating to visual display properties of the object relative to the interactive data structure, wherein receiving includes an option to deactivate the display of one or more objects and an option to activate the display of one or more objects;
    propagate the one or more modifications to the objects to update the interactive data structure, and
    employ the interactive data structure to display the one or more items of content in the interactive data structure, including the modifications relating to the visual display, via the web-based interface.

14. The system of claim 13 wherein the object component is operative to associate the one or more objects with one or more applications.

15. The system of claim 13 wherein the object component is operative to combine one or more objects according to a structure identified by the content associated with the one or more objects.

16. The system of claim 13 wherein the object component is operative to receive a user interaction with the one or more objects comprising the interactive data structure and modify the content associated with the one or more objects according to the user interaction.

17. The system of claim 13 wherein an object component is operative to: receive an indication of the combination of a plurality of objects; identify the content associated with the plurality of objects; identify an action associated with the combination of the plurality of objects; and execute the action associated with the combination of the plurality of objects using an application associated with the action and the content associated with the plurality of objects.

* * * * *